United States Patent
Boero et al.

(10) Patent No.: US 9,482,403 B2
(45) Date of Patent: Nov. 1, 2016

(54) AUTOMOTIVE LIGHT AND METHOD OF MANUFACTURING

(71) Applicant: Automotive Lighting Italia S.p.A. a Socio Unico, Torino (IT)

(72) Inventors: Cristiano Boero, Torino (IT); Domenico Ferigo, Torino (IT); Nicola Schiccheri, Torino (IT); Fabio Leone, Torino (IT); Alessandro Buzzurro, Torino (IT)

(73) Assignee: Automotive Lighting Italia S.p.A. a Socio Unico, Turin (IT)

( * ) Notice: Subject to any disclaimer, the term of this patent is extended or adjusted under 35 U.S.C. 154(b) by 63 days.

(21) Appl. No.: 14/667,789

(22) Filed: Mar. 25, 2015

(65) Prior Publication Data

US 2015/0276158 A1   Oct. 1, 2015

(30) Foreign Application Priority Data

Mar. 28, 2014  (IT) .............................. PD2014A0080

(51) Int. Cl.
*F21S 8/10* (2006.01)
*B29C 65/16* (2006.01)
(Continued)

(52) U.S. Cl.
CPC .......... *F21S 48/1208* (2013.01); *B29C 65/167* (2013.01); *B29C 65/1635* (2013.01);
(Continued)

(58) Field of Classification Search
CPC .............. F21S 48/1208; F21S 48/212; F21S 48/2206; F21S 48/1145; F21S 48/214; F21S 48/2218; F21S 48/1109; F21S 48/1225; F21S 8/10; B60Q 1/0088; B60Q 1/00; B29C 65/1635; B29C 65/1674; B29C 66/1142; B29C 66/542; B29C 66/73365; B29C 65/1654; B29C 66/7332; B29C 66/71; B29C 65/167; B29C 65/1687; B29C 66/131; B29C 66/723; B29C 66/73322; B29C 65/16; F21Y 2101/025; F21V 9/08; B29L 2031/30; B29L 2011/00; B29L 2031/747; B29K 2101/12; B29K 2033/12; B29K 2069/00
See application file for complete search history.

(56) References Cited

U.S. PATENT DOCUMENTS 5,721,039 A * 2/1998 Yanagihara ........... B29C 45/062
                                                       359/642
6,607,296 B2 * 8/2003 Yoshinaga .............. B29C 45/16
                                                        264/1.7
(Continued)

FOREIGN PATENT DOCUMENTS

JP   2003123506 A    4/2003
JP   2007109429 A    4/2007
(Continued)

OTHER PUBLICATIONS

Jul. 31, 2014 European Search Report for Italian Patent Application No. PD20140080.

*Primary Examiner* — Bao Q Truong
(74) *Attorney, Agent, or Firm* — Howard & Howard Attorneys PLLC

(57) ABSTRACT

A method of manufacturing an automotive light including the steps of: providing at least one laser diode emitting a light beam with a characteristic emission spectrum; providing a container body delimited by a first perimetral profile; providing a molded lenticular body delimited by a second perimetral profile and having at least first and second overlapping integral layers with different transmittance values in relation to the laser emission spectrum; at least partially associating the perimetral profiles; and at least partially welding at the perimetral profiles with the laser, wherein the laser beam is routed towards the perimetral profiles so as to reach the first perimetral profile after passing through at least one of the layers of the lenticular body, and wherein the container body acts as an absorbing member in relation to the light beam and the lenticular body acts as a transmissive member of the light beam.

27 Claims, 7 Drawing Sheets

(51) Int. Cl.
*B29C 65/00* (2006.01)
*B60Q 1/00* (2006.01)
*F21V 9/08* (2006.01)
B29L 31/00 (2006.01)
B29K 101/12 (2006.01)
B29L 11/00 (2006.01)
B29L 31/30 (2006.01)
F21Y 101/02 (2006.01)

(52) U.S. Cl.
CPC ....... *B29C65/1674* (2013.01); *B29C 65/1687* (2013.01); *B29C 66/1142* (2013.01); *B29C 66/131* (2013.01); *B29C 66/542* (2013.01); *B29C 66/723* (2013.01); *B60Q 1/0088* (2013.01); *F21S 48/1109* (2013.01); *F21S 48/1145* (2013.01); *F21S 48/1225* (2013.01); *F21S 48/212* (2013.01); *F21S 48/214* (2013.01); *F21S 48/2206* (2013.01); *F21S 48/2218* (2013.01); *F21V 9/08* (2013.01); *B29C 65/1654* (2013.01); *B29C 66/71* (2013.01); *B29C 66/7332* (2013.01); *B29C 66/73322* (2013.01); *B29C 66/73365* (2013.01); *B29K 2101/12* (2013.01); *B29L 2011/00* (2013.01); *B29L 2031/30* (2013.01); *B29L 2031/747* (2013.01); *F21Y 2101/025* (2013.01)

(56) References Cited

U.S. PATENT DOCUMENTS

| | | | |
|---|---|---|---|
| 7,329,025 B2* | 2/2008 | Yasuda | B23K 26/18 156/272.8 |
| 7,575,495 B2* | 8/2009 | Yamazaki | B29C 65/1635 445/23 |
| 8,556,479 B2* | 10/2013 | Hokoda | B29C 66/116 156/272.8 |
| 9,061,468 B2* | 6/2015 | Sagesaka | B29C 65/1635 |
| 2006/0126355 A1 | 6/2006 | Yasuda et al. | |

FOREIGN PATENT DOCUMENTS

| | | |
|---|---|---|
| JP | 2011255628 A | 12/2011 |
| JP | 201228143 A | 2/2012 |

* cited by examiner

AUTOMOTIVE LIGHT AND METHOD OF MANUFACTURING

CROSS-REFERENCE TO RELATED APPLICATION

This application is based upon and claims priority to Italian Patent Application No. PD2014A000080, filed on Mar. 28, 2014.

BACKGROUND OF THE INVENTION

1. Field of the Invention

The present invention relates, generally, to automotive lights and, more specifically, an automotive light and a method of manufacturing an automotive light.

2. Description of Related Art

The term "automotive light" as used in the related art is known to refer to either a rear automotive light or a front automotive light (also known as a "headlight") for use as lighting and/or signaling devices of a vehicle, which includes at least one external automotive light having a lighting and/or signaling function towards the outside of the vehicle (such as, for example: a sidelight, an indicator light, a brake light, a rear fog light, a reverse light, a dipped beam headlight, a main beam headlight, etc.).

The automotive light generally includes a container body, a lenticular body, and at least one light source. The lenticular body is placed so as to close a mouth of the container body so as to form a housing chamber. The light source is arranged inside the housing chamber, which may be directed so as to emit light towards the lenticular body when powered with electricity.

In manufacturing automotive lights, once the various components have been assembled, there needs to be attachment and hermetic sealing of the lenticular body to the container body. Typically, sealing is effected by welding. It will be appreciated that welding may also be utilized for other components of a more complex automotive light, for example components arranged inside the housing chamber.

There are a number of different welding solutions known in the related art. From a mechanical point of view, the welds of the prior art make it possible to realise joints which are reliable over time both from the mechanical point of view, considering the continuous mechanical and thermal stresses (vibrations, and atmospheric conditions) to which an automotive light is continually subjected; and from the sealing point of view, for example preventing infiltration of water or dirt from the outside towards the inside of the light.

Assembly techniques known in the related art can be expensive because the welding processes of the lenticular bodies to the container body are rather complex and, thus, slow. For example, it is known of to use vibration welding techniques for the assembly of automotive lights. Conventional laser welding applications in automotive lights, with the techniques currently in use, are not very efficient given that it is necessary to weld together complex geometries such as those of automotive lights. Specifically, the lenticular bodies and the container bodies of automotive lights are made of polymeric materials with highly complex geometries and with curved or straight coupling surfaces having inclinations highly variable along the entire perimeter of the mutual coupling. Moreover, it will be appreciated that laser welding of polymeric bodies generally assumes localized supply of thermal energy capable of locally melting polymeric bodies respectively having sufficient transmittance and absorbance of electromagnetic radiation emitted by a laser source (such as a laser diode). More specifically, light energy of electromagnetic radiation emitted by the laser source is transformed into heat during absorption in the absorbent polymer body. The absorbent polymer body thus simultaneously melts locally and conducts heat to the transmissive polymer body in a defined welding area corresponding to an interface area between the bodies in contact. The softened polymeric bodies can consequently penetrate each other, connecting permanently once cooled.

In headlights, the polymeric bodies may include the lenticular body and the container body of the automotive light, where the lenticular body acts as a transmissive polymeric body and the container body serves as an absorbent polymeric body. However, the complex geometry of automotive lights or their components (such as the container body and the lenticular body) are ill-adapted for use with conventional laser welding techniques, which are in fact optimised for applications on flat walls, simple geometries, and relatively thin body thicknesses. Thus, laser welding techniques are currently little used on automotive lights in that there is no guarantee of satisfactory results and alternative welding techniques are more cost/time competitive.

In addition, certain complexities of automotive lights further discourages and makes current laser welding techniques inconvenient. By way of example, a component of the automotive light (such as the lenticular body) can be crossed by light emitted by the light source so as to effect lighting of the automotive light. The lenticular body may have a coloration so as ensure that the color of the light emitted by the light source complies with government-mandated regulations (for example, a stop light of the automotive light may be realised with a substantially white light source and a lenticular body tending to red). However, during the laser welding process, a red colored lenticular body absorbs a lot of light energy in comparison to a clear lenticular body to the detriment of the light energy provided by the laser source, which needs to be able to provide a predetermined light energy in the welding area. The increased absorption due to the presence of a colored lenticular body acting as the transmission element, which filters the radiation emitted, requires the use of higher power laser beams, which consequently results in high energy consumption and increased welding costs.

Because of the foregoing considerations, laser welding techniques are little used on conventional automotive lights since they are too complex, expensive, and inconvenient to implement when compared to alternative welding techniques, such as friction welding. Thus, there remains a need in the art for a laser welding method of polymeric bodies used in automotive lights able to reduce the power of the laser source.

SUMMARY OF THE INVENTION

The present invention overcomes the disadvantages in the related art in an automotive light and a method of manufacturing the automotive light. The method includes the steps of: providing at least one laser diode emitting a light beam or radiation having a characteristic emission spectrum; providing a container body delimited by a first perimetral profile; providing a lenticular body delimited by a second perimetral profile, wherein the lenticular body is obtained via a molding technique such that the lenticular body includes at least a first and a second layer at least partially overlapping and integral to each other, with the layers having different transmittance values in relation to the emission spectrum of the laser diode; associating the respective first and second perimetral profile of the container body and the lenticular body at least partially between each other; and laser welding at least partially between the lenticular body and the container body at the perimetral profiles, wherein the light beam emitted by the laser diode is routed towards the perimetral profiles so as to reach the first perimetral profile of the container body after passing through at least one of the layers of the lenticular body having different transmittance values in relation to the emission spectrum of the laser diode, and wherein the container body acts as an absorbing member in relation to the light beam and the lenticular body acts as a transmissive member of the light beam.

In this way, the automotive light and method of the present invention overcome the technical drawbacks in the related art which otherwise make laser welding of automotive lights inconvenient and expensive.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
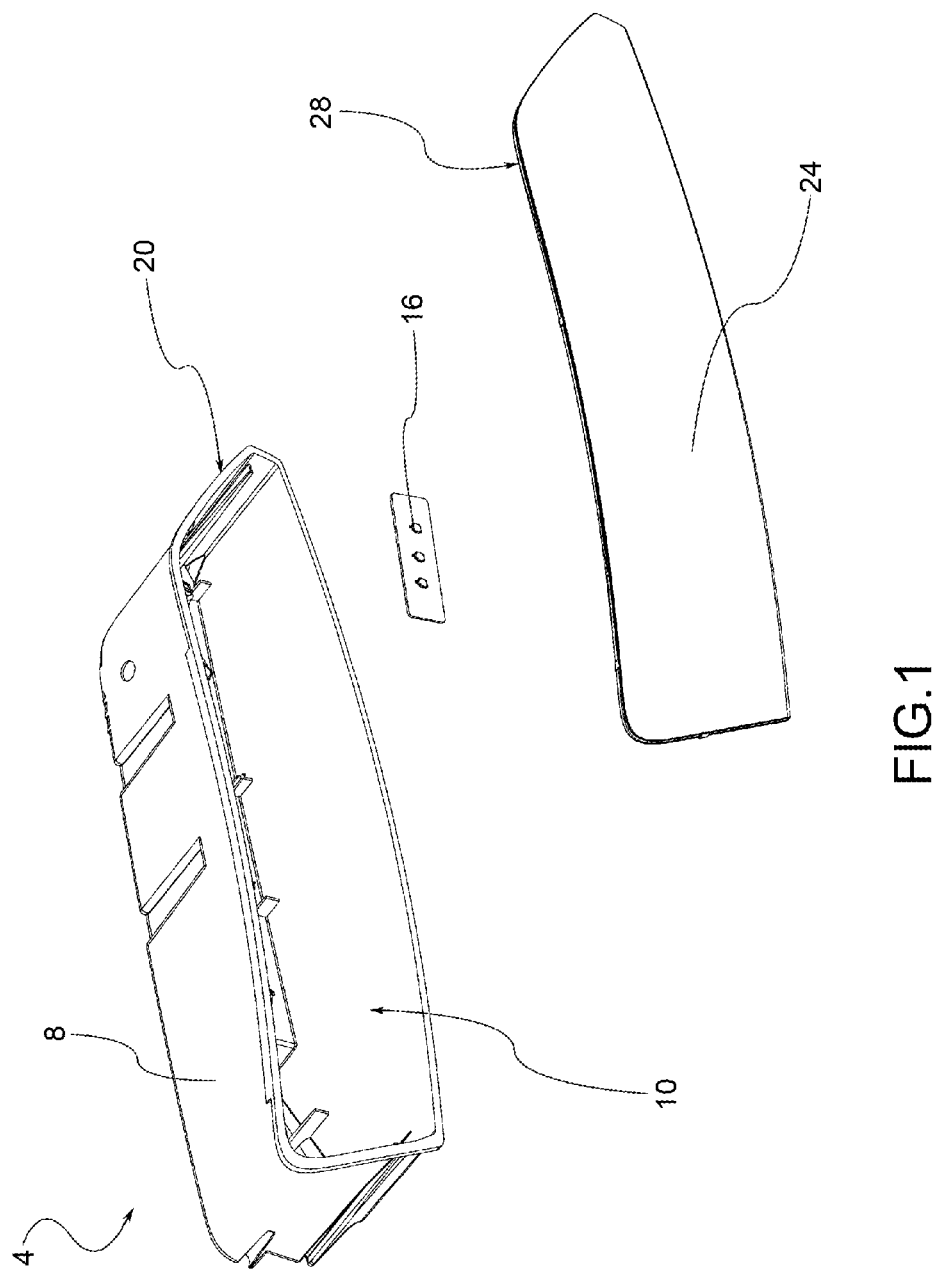
FIG. 1 is an exploded perspective view of parts of an automotive light.
Figure 2:
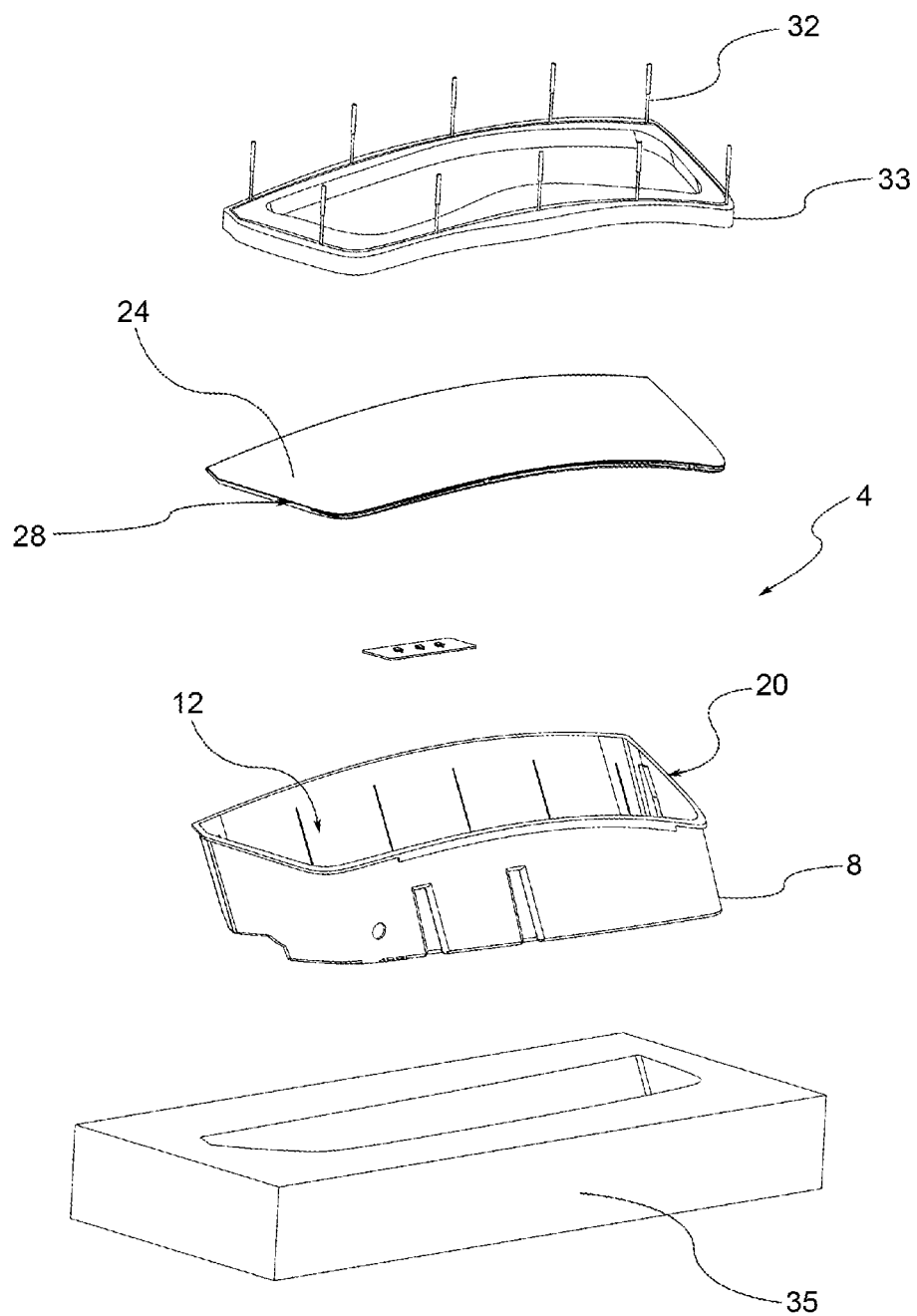
FIG. 2 is an exploded perspective view of the automotive light and equipment for welding the automotive light, according to one embodiment of the present invention.
Figure 3:
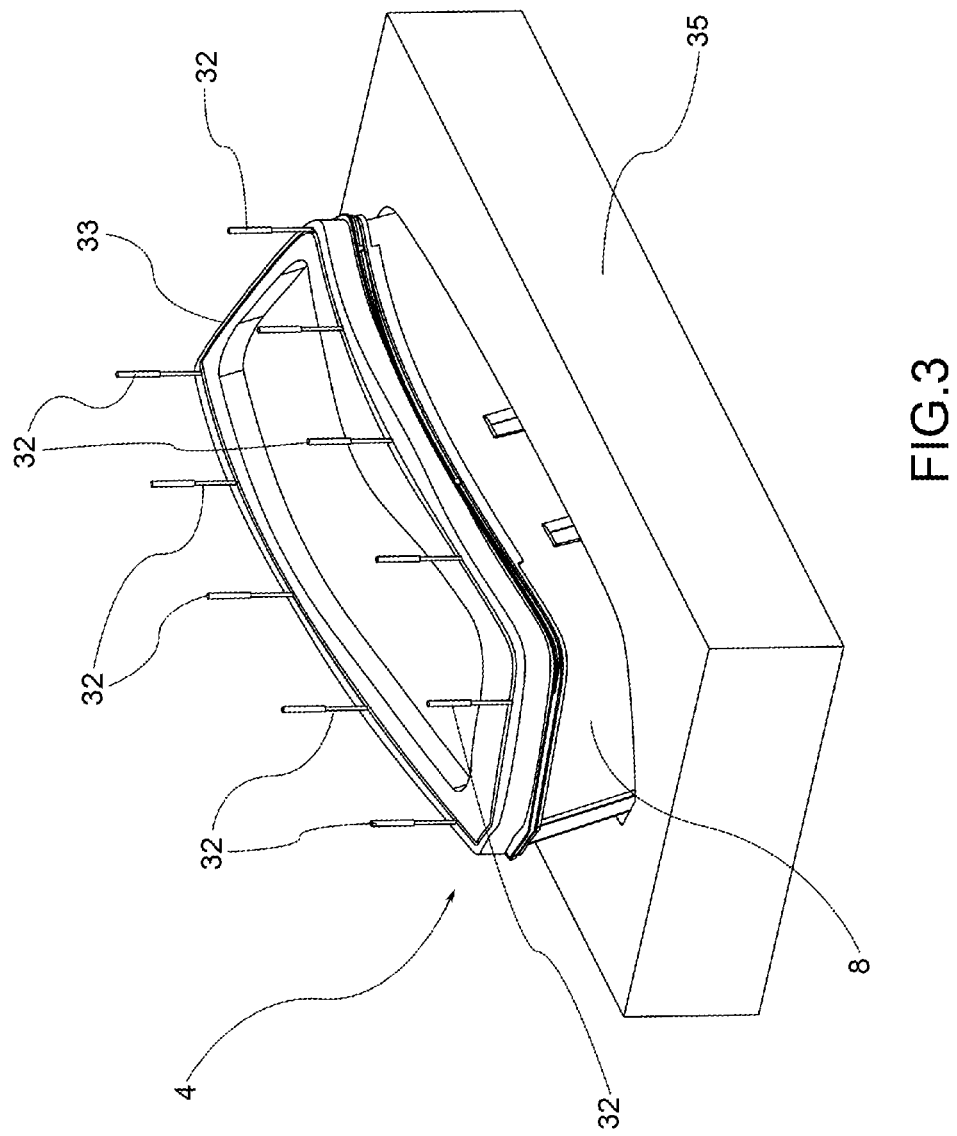
FIG. 3 is a perspective view of the automotive light and equipment of FIG. 2 shown in an assembled configuration.
Figure 4:
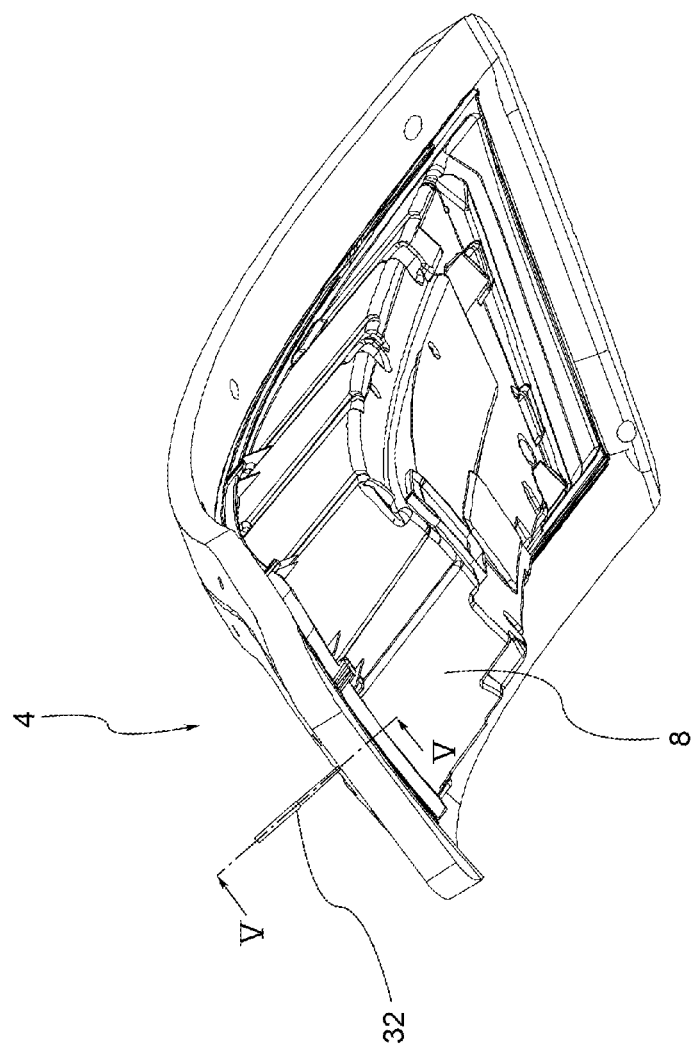
FIG. 4 is a further perspective view of the automotive light and equipment of FIG. 2.

The elements or parts of elements common to the embodiments described below are indicated using the same reference numerals. Referring now to the Figures, an automotive light is generally indicated at 4. It will be appreciated that the automotive light 4 could be a rear automotive light or a front automotive light (also known as a headlight). The automotive light includes at least one outer vehicle light having a lighting and/or signaling function (for example: a front, rear, or lateral sidelight; an indicator light; a brake light; a rear fog light; a dipped beam headlight; a main beam headlight; etc.).

The automotive light 4 includes a container body 8, usually of polymeric material, which typically permits attachment of the automotive light 4 to the vehicle. For the purposes of the present invention, the container body 8 may be any shape and size, and may even be an element inside the automotive light (for example: not directly fixed to or associated with the bodywork or other fastenings of the vehicle).

In one embodiment, the container body 8 delimits a containment housing 12 which houses at least one light source 16, connected to a source of electric power, and adapted to emit a light beam to propagate outside the automotive light. For the purposes of the present invention, the type of light source 16 used is irrelevant. However, the light source 16 may advantageously be a light source of light emitting diodes (LED).

The container body 8 is delimited by a first perimetral profile 20. A lenticular body 24 in turn delimited by a second perimetral profile 28 is joined to the container body 8. For the purposes of the present invention, the lenticular body 24 may be either external to the automotive light 4 so as to define at least one outer wall of the automotive light directly subject to the atmosphere; or the lenticular body may also be internal to the automotive light 4, for example not directly subject to the external atmosphere and in turn covered directly or indirectly by one or more screens or covering panels.

In one embodiment, the lenticular body 24 may be adapted to close the containment housing 12 and to transmit the light beam produced by the light source 16 to the outside of the automotive light 4. To this end, the lenticular body 24 may be made of at least partially transparent or semi-transparent or translucent material, and may also include one or more opaque portions so as to allow at least partial crossing of the light beam produced by the light source 16.

The second perimetral profile 28 is counter-shaped relative to the first perimetral profile 20 so as to be coupled with the latter according to a shaped coupling, in the assembled configuration of the automotive light 4. The assembly of the automotive light 4 includes the step of joining at least partially to each other the respective first and second perimetral profiles 20, 28. For example, the step is provided for of arranging the lenticular body 24 to close the containment housing 12 of the container body 8 so as to join the respective first and second perimetral profiles 20, 28.

The method of manufacturing the automotive light provides for joining the lenticular body and the container body to each other in correspondence of the perimetral profiles 20, 28, via laser welding. The laser welding process may be realized with different techniques (for example: with simultaneous laser welding, almost-simultaneous laser welding, border laser welding, mask laser welding, radial laser welding, globe laser welding, etc.). However, in the description that follows, specific reference will be made to simultaneous laser welding for exemplary purposes and by way of non-limiting example. In particular, at least a laser source is provided which emits a laser beam or a light beam or an electromagnetic radiation having a characteristic emission spectrum (not shown, but generally known in the related art). Here, the term "characteristic emission spectrum" refers to electromagnetic radiation emitted substantially at a certain frequency or having a certain wavelength. In one embodiment, the laser source is a laser diode which emits a laser beam. In one embodiment, the laser source may include: a $CO_2$ laser, in which the laser beam is produced by a gas mixture of $CO_2$; or a YAG laser, in which the laser beam is produced by a solid state crystal.

The laser source emits a light beam that can be sent directly to the lenticular body 24. In one embodiment, the laser source is associated with an optical fibre 32 inserted in a matrix/guide 33 which supports the optical fiber 32 and guides the light beam emitted by the laser source. The welding advantageously takes place after blocking the container body 8 in a respective attachment block 35.

Advantageously, provided lenticular body 24 is manufactured via a molding technique where the lenticular body 24 includes at least a first and a second layer 36, 40 at least partially overlapping and integral to each other. In one embodiment, the first layer 36 faces outside of the automotive light 4, and the second layer 40 faces towards the containment housing 12. Apart from the mutual positioning of the layers, the layers 36, 40 advantageously have different transmittance values in relation to the emission spectrum of the laser source. More specifically, the layers 36, 40 have different optical properties such that, in correspondence with the characteristic emission spectrum of the laser source, they show different transmittance values. Consequently, the light beam emitted by the laser source will be transmitted or absorbed differently by the two layers 36, 40.

In particular, the welding of the lenticular body 24 on the container body 8 is a laser welding wherein the light beam emitted by the laser diode is routed towards the perimetral profiles 20, 28 so as to reach the first perimetral profile 20 of the container body 8 after passing through at least one of the layers 36, 40 of the lenticular body 24 having different transmittance values in relation to the emission spectrum.

During the welding step, the container body 8 acts as an absorbing member in relation to the light beam emitted by the laser source and the lenticular body 24 acts as a transmissive member of the light beam.

In one embodiment, the light radiation emitted by the laser source passes through both the first layer 36 and the second layer 40 of the lenticular body 24 before reaching the welding area positioned at an interface 44 between the first and second perimetral profiles 20, 28.

In one embodiment, one of the layers 36, 40 of the lenticular body 24 is a layer in a polymer material having transmittance values greater than 90%, measured in the emission spectrum of the laser source. For example, at least one of the layers 36, 40 of the lenticular body 24 may be a layer made of a substantially clear material.

In one embodiment, at least one of the layers 36, 40 is made of a polymer material having a desired color, wherein the layer 36, 40 has a transmittance sufficient to not soften the material hit by the light beam and to transmit the light beam towards the perimetral profiles 20, 28 and towards the interface 44.

It is possible to make the first layer 36 and the second layer 40 of the lenticular body 24 with the same material. For example the material of the first and/or second layer 36, 40 of the lenticular body 24 is a resin such as PMMA, PC, and the like. In one embodiment, the layer 36, 40 of the lenticular body 24 with a greater transmittance value has a greater thickness than the layer 40, 36 with a lower transmittance value. In one embodiment, the lenticular body 24 has an overall thickness of 4.5 mm, wherein 2 mm are for the layer 36, 40 having the lower transmittance value and 2.5 mm are for the layer 40, 36 having the greater transmittance value. Thus, there is improved energy efficiency since there is lower power consumption for the same overall path to be traversed by the light beam to reach the interface 44 (for example, thickness of the lenticular body 24) and therefore higher transmission efficiency is increased.

For the purposes of the present invention, the first and second layers 36, 40 of the lenticular body 24 are obtained by a technique of co-molding. For example, the lenticular body 24 is obtained with a multicolor injection molding technique, wherein equipment is used provided with a mold including a fixed platform having at least two matrix half-molds, and a rotating platform having a punch half-mold able to move relative to the fixed platform so as to couple the punch half-mold with each matrix half-mold present on the fixed platform.

Irrespective of the specific molding technique used, the lenticular body 24 has, as shown, at least two layers 36, 40 integral with each other and at least partially overlapping. The two or more layers 36, 40 may advantageously be made of different colors: typically, one of the layers is clear (or substantially transparent) and the other is colored to filter the light emitted by the light source so that the light beam produced in output from the light has the desired color (for example, red for a side light or stop light, orange for an indicator light, etc.). The coloration (for example, doping) of the material to obtain a colored layer of the lenticular body, modifies the transmittance for the same spectrum of the incident beam: generally, the transmittance increases in the absence of doping (for example, in the presence of a clear layer), and decreases as the doping increases.

As noted above, because of the purposes of the functions of an automotive light, assuming that the light sources commonly used emit substantially white light beams (for example), the lenticular body 24 needs to have one or more colored pieces so that the light beam output has the desired color.

Conventional lenticular bodies welded with laser technology have colored portions in a single piece: specifically, the lenticular body is composed of a single colored layer and then doped in the desired color, whish is inefficient at the moment of trying to laser weld the lenticular body 24 to the container body 8. Advantageously, according to one embodiment of the present invention, the lenticular body instead has at least two layers colored with different doping in order to at least partially increase the overall transmittance of the lenticular body. This effect can be obtained by applying a clear layer (with transmittance greater than 90%) to a colored layer (for example: red, with transmittance less than 90%), or overlapping two colored layers so as to provide light output of the desired color and with a total transmittance of the lenticular body that is better than that of a corresponding single colored layer.

In one embodiment, at the second perimetral profile 28, the lenticular body 24 includes a second contact edge 48 with the container body 8, where the second contact edge 48 follows the respective second perimetral profile 28 and projects therefrom in the direction of the container body 8. This way, the light radiation emitted by the laser source is directed so as to be channelled in the second contact edge 48 and to impact on the first perimetral profile 20 of the container body 8.

Figure 6:
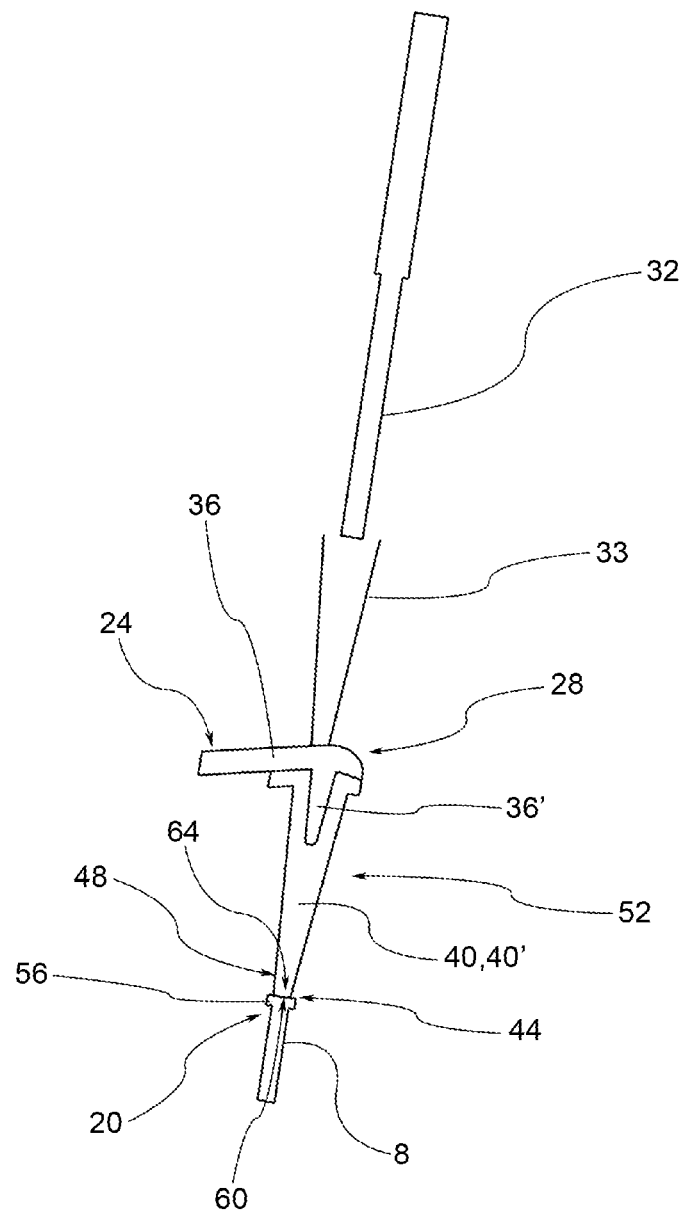
FIG. 6 is a sectional view of a welding step of an automotive light and equipment according to one embodiment of the present invention.
Figure 7:
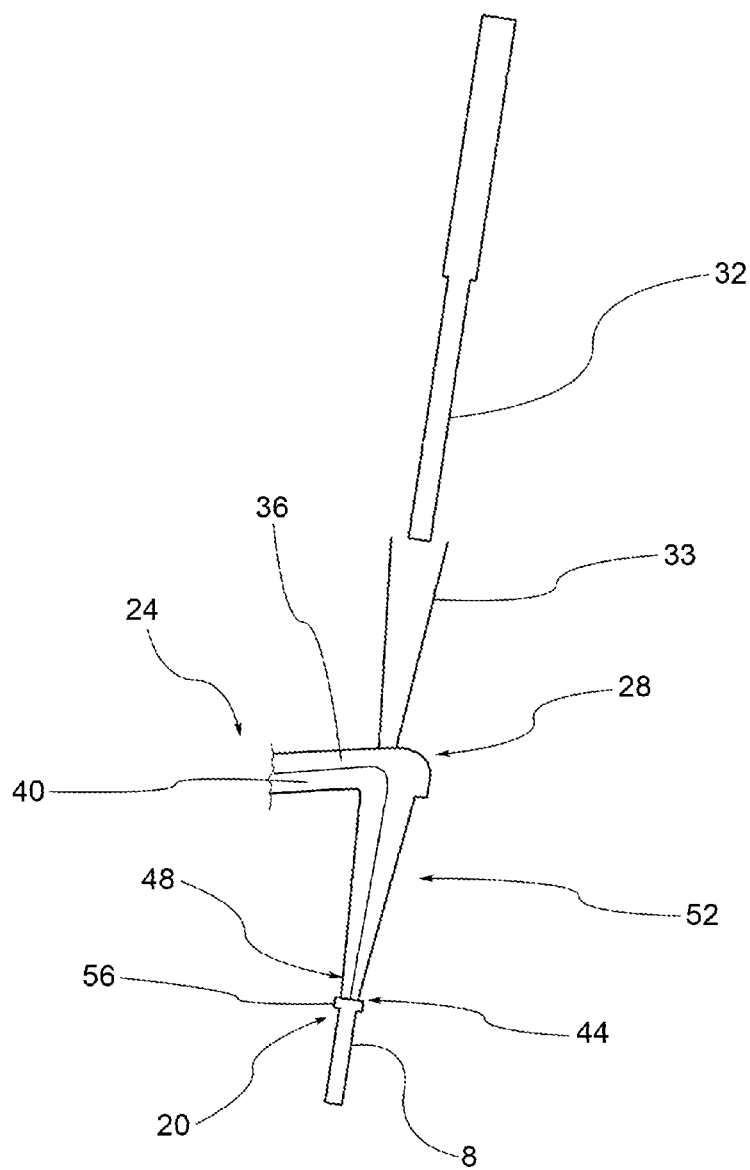
FIG. 7 is a sectional view of a welding step of an automotive light and equipment according to another embodiment of the present invention.

In one embodiment, the second contact edge 48 is integral with the second layer 40 of the lenticular body 24. For example, the second layer 40 of the lenticular body 24 is the layer having a higher transmittance and also encompasses the second contact edge 48: this way it further increases the path of the light beam inside the layer having a higher transmittance In one embodiment, the second contact edge 48 includes overlapping portions of the first and second layers 36, 40 (see FIGS. 6-7). For example, as shown in FIG. 6, the overlapping portions 36', 40' include at least one protrusion 36' of the first layer 36 at least partially penetrated into the second contact edge 48 of the second layer 40.

Figure 5:
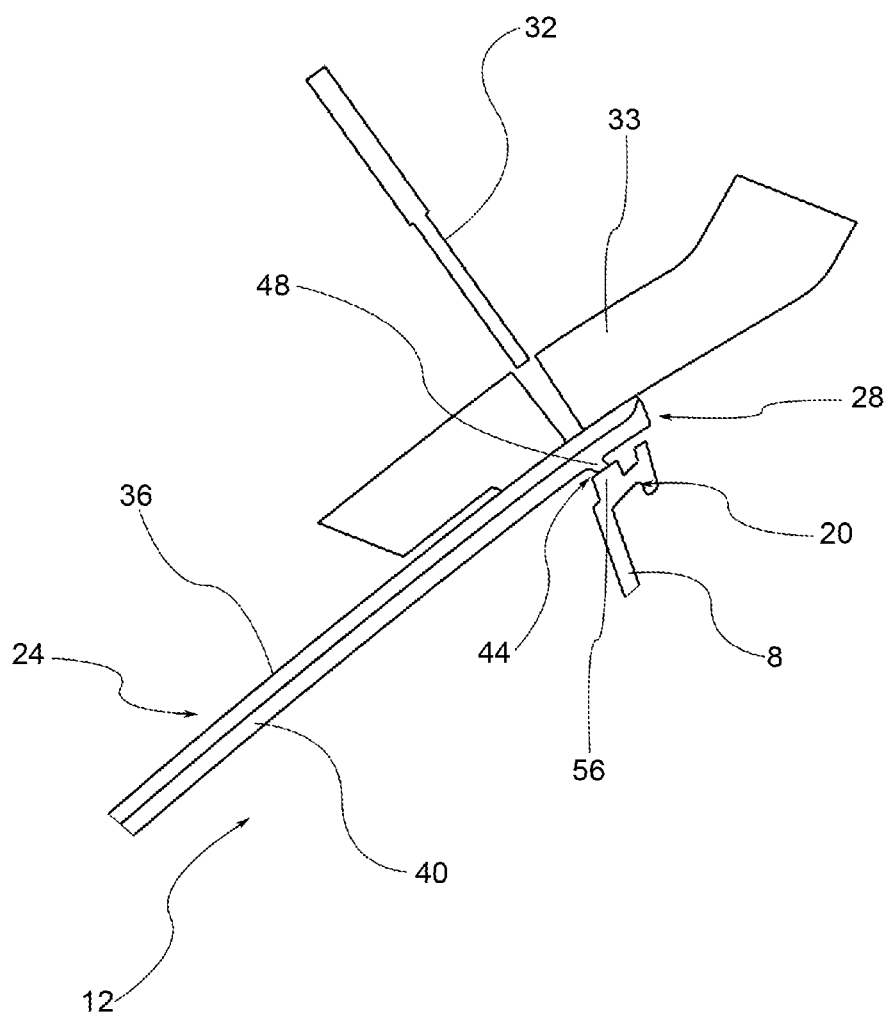
FIG. 5 is a partial sectional view of the automotive light and equipment taken along line V-V of FIG. 4.

With one possible welding technique, the light radiation emitted by the laser source is directed according to a direction substantially perpendicular to the layers 36, 40 of the lenticular body, at the perimetral profiles 20, 28 (see FIG. 5).

In one embodiment, the lenticular body 24 at the second perimetral profile 28 includes a folded portion 52 towards the container body 8. The folded portion 52 is integral with the lenticular body 24 and defines the second contact edge 48 with the container body 8, and the folded portion 52 in turn includes an overlapping of the first and second layers 36, 40 of the lenticular body 24 (see FIGS. 6-7). The light radiation emitted by the laser source is directed at the second contact edge 48 according to a direction substantially parallel to the layers 36, 40 of the lenticular body 24. In this case also, the light radiation is directed so as to channel itself into the second contact edge 48, along each of the layers 36, 40 of the lenticular body and to impact on the first perimetral profile 20.

In one embodiment, at the first perimetral profile 20, the container body 8 includes a first contact edge 56 in contact with the container body 8. The first contact edge 56 follows the respective first perimetral profile 20 and projects therefrom in the direction of the lenticular body 24. The first perimetral profile 20 is at least partially counter-shaped relative to the second perimetral profile 28, and the first perimetral profile 20 has an abutment wall 60 which receives in abutment the second contact edge 56. The abutment wall 60 forms the interface 44 between the lenticular body 24 and the container body 8. Advantageously, the abutment wall 60 has a thickness greater than or equal to a corresponding supporting wall 64 of the second contact edge 48.

As mentioned above, the laser welding techniques for the manufacturing method of the present invention may be of various types. For example, according to a 'simultaneous' welding technique, the laser welding step may be performed by one or more optical fibers which simultaneously emit respective light radiation on separate predetermined portions of the perimetral profiles 20, 28. It is also possible to perform the laser welding step according to a 'border' welding technique with at least one mobile laser source, with the relative optic fibers 32, which is guided so as to direct the light radiation along the perimetral profiles 20, 28.

It will be appreciated that the manufacturing method according to the invention makes it possible to overcome the disadvantages of the prior art. Specifically, because of the method of the present invention, it is possible to also apply the technique of laser welding to automotive lights having any type of complex geometry, such as geometry having curvatures and thicknesses highly variable along the perimeter of the light.

The laser welding technique of the present invention is more convenient than alternative welding techniques of the prior art in the field of automotive lights, and affords advantages both in terms of cost and time for the same quality of the welding joint. In particular, because of the presence of at least two layers at different transmittance values with respect to the emission spectrum of the laser source, there is a reduction of consumption (and therefore of costs) since a greater part of the light beam can be transmitted to the welding interface between the lenticular body and the container body. The light beam on the interface portion is thus suitable to obtain a welded joint having excellent mechanical qualities, without waste of luminous power. Further, irrespective of the technique used to perform the laser welding step (for example, the 'border' or 'simultaneous' type), the laser welding step is quick and reliable, allowing a further reduction of assembly costs for the same quality of the joint compared to the prior art.

In addition, the utilization of a molded lenticular body with at least two layers makes it possible to obtain perimeter profiles and/or contact edges of the lenticular body having thicknesses greater than those obtainable using conventional molding techniques. Because of the increased thickness of the perimetral profiles and relative contact edges of the lenticular body, it is possible to channel and transmit to the container body a greater part of the light beam to the benefit of a greater heating of the weld joint which, thus, results in energy savings due to greater energy efficiency. Moreover, because of the increased thickness of the perimetral profiles and relative contact edges of the lenticular body, it is also possible to channel a light beam having a higher light output, for example, in order to weld in interface zones (between the lenticular body and the container body) relatively distant from the laser source emitter (for example, for automotive lights having particular geometries and particularly pronounced heights or thicknesses of the lenticular body). More specifically, if the lenticular body is particularly advanced or pronounced outwardly with respect to the interface surface, while placing the laser source and the relative optical fibers at the limit of contact with the outer surface of the lenticular body, the light beam will have to cover a relatively long path before reaching the interface surface. During the path, the light beam will be at least partially absorbed by the lenticular body and thus, in order to locally melt the container body (absorbent) at the interface surface, a high power light beam would need to be sent. This way, consumption would increase and there would be risk producing unwanted melting or softening in different portions of the lenticular body. In other cases, the presence of overly narrow perimetral profiles and relative contact edges of the lenticular body would lead to the non-melting of the plastic material at the interface surface, making the welding impossible. Rather, because of the realization of the lenticular body of at least two layers, it is possible to create profiles and edges of adequate thickness, obtaining an effective transmission of the light beam at elevated distances or depths (for example, the distance between the outer surface of the lenticular body and the interface surface between the lenticular body and the container body), thus making laser welding with any geometry of the automotive light possible and efficient.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method of manufacturing an automotive light comprising the steps of:
providing at least one laser diode for emitting a light beam or radiation having a characteristic emission spectrum;
providing a container body delimited by a first perimetral profile;
providing a molded lenticular body delimited by a second perimetral profile and having at least a first and a second layer the lenticular body including at least a first and a second layer, the first layer and the second layer at least partially overlapping and integral to each other, the first layer and the second layer having different transmittance values in relation to the emission spectrum of the laser diode;
associating the first and second perimetral profiles at least partially between each other; and
laser welding at least partially between the lenticular body and the container body at said perimetral profiles,
wherein the light beam emitted by the laser diode is routed towards the perimetral profiles so as to reach the first perimetral profile of the container body after passing through at least one of the layers of the lenticular body having different transmittance values in relation to the emission spectrum of the laser diode, and wherein the container body acts as an absorbing member in relation to the light beam and the lenticular body acts as a transmissive member of the light beam.

2. The method as set forth in claim 1, including the steps of:
providing at least one light source electrically connected to a source of electric power, adapted to emit a light beam to propagate outside the automotive light, and housed in a containment housing delimited by the container body, wherein the lenticular body is adapted to close the containment housing and is adapted to receive the light beam generated from the light source and propagate the light beam outside the light;
providing the lenticular body in a closing position of the containment housing of the container body so as to associate the respective first and second perimetral profiles with each other;
wherein the first layer of the lenticular body faces towards the outside of the automotive light, and the second layer of the lenticular body faces towards the containment housing, the layers having different transmittance values in relation to the emission spectrum of the laser diode.

3. The method as set forth in claim 1, wherein the light radiation emitted by the laser diode passes through both the first layer and the second layer of the lenticular body before reaching the welding area at an interface between the first and second perimetral profiles.

4. The method as set forth in claim 1, wherein one of the layers of the lenticular body is a layer in a polymer material having transmittance values, in the emission spectrum of the laser diode, greater than 90%.

5. The method as set forth in claim 1, wherein at least one of the layers of the lenticular body is made from a substantially clear material.

6. The method as set forth in claim 1, wherein at least one of the layers is made from a polymer material having a predetermined color, the layer having a transmittance sufficient to transmit the light beam towards the perimetral profiles and not soften the material hit by the light beam.

7. The method as set forth in claim 1, wherein the first layer and the second layer of the lenticular body are made from the same material.

8. The method as set forth in claim 1, wherein the material of the first and/or the second layer of the lenticular body is a resin.

9. The method as set forth in claim 1, wherein the layer of the lenticular body having the greater transmittance value has a greater thickness than the layer having the lower transmittance value.

10. The method as set forth in claim 1, wherein the lenticular body has an overall thickness of 4.5 mm, wherein 2 mm are for the layer having the lower transmittance value and 2.5 mm are for the layer having the greater transmittance value.

11. The method as set forth in claim 1, wherein said first and second layers of the lenticular body are obtained via co-molding or over-pressing technique.

12. The method as set forth in claim 1, wherein the lenticular body is obtained with a multicolor injection molding technique using equipment provided with a mold including a fixed platform having at least two matrix half-molds, and a rotating platform having a punch half-mold, capable of moving relative to the fixed platform, so as to couple the punch half-mold to each matrix half-mold present on the fixed platform.

13. The method as set forth in claim 1, wherein at the second perimetral profile, the lenticular body includes a second contact edge with the container body, the second contact edge following the respective second perimetral profile and projecting from the latter in the direction of the container body.

14. The method as set forth in claim 13, wherein the second contact edge is integral to the second layer of the lenticular body.

15. The method as set forth in claim 14, wherein the second layer of the lenticular body is the layer having greater transmittance.

16. The method as set forth in claim 13, wherein the second contact edge includes overlapping portions of the first and second layers.

17. The method as set forth in claim 16, wherein the overlapping portions include at least one protrusion of the first layer at least partially penetrated into the second contact edge of the second layer.

18. The method as set forth in claim 1, wherein the light radiation emitted by the laser diode is directed at the perimetral profiles according to a direction substantially perpendicular to the layers of the lenticular body.

19. The method as set forth in claim 13, wherein the light radiation emitted by the laser diode is directed so as to channel into the second contact edge and to impact on the first perimetral profile.

20. The method as set forth in claim 13, wherein at the second perimetral profile, the lenticular body includes a folded portion towards the container body, the folded portion being integral with the lenticular body and defining the second contact edge with the container body, the folded portion including an overlapping of the first and second layers of the lenticular body.

21. The method as set forth in claim 20, wherein the light radiation emitted by the laser diode is directed at the second contact edge according to a direction substantially parallel to the layers of the lenticular body.

22. The method as set forth in claim 20, wherein the light radiation is directed so as to channel into the second contact edge, along each of the layers of the lenticular body, and to impact on the first perimetral profile.

23. The method as set forth in claim 13, wherein at the first perimetral profile, the container body includes a first contact edge with the container body, the first contact edge following the respective first perimetral profile and projecting from the latter in the direction of the lenticular body.

24. The method as set forth in claim 23, wherein the first perimetral profile is at least partially counter-shaped relative to the second perimetral profile; and wherein the first perimetral profile has an abutment wall receiving in abutment the second contact edge, the abutment wall having a thickness greater than or equal to a corresponding support wall of the second contact edge.

25. The method as set forth in claim 1, wherein the laser welding step takes place via a simultaneous welding technique with one or more optical fibers that emit respective light radiations simultaneously on different predetermined portions of the perimetral profiles.

26. The method as set forth in claim 1, wherein the laser welding step takes place via a border welding technique with at least one moving laser diode guided so as to route the light radiation along the perimetral profiles.

27. An automotive light manufactured via the method as set forth in claim 1.

* * * * *